United States Patent [19]

Berfield

[11] Patent Number: 4,640,521
[45] Date of Patent: Feb. 3, 1987

[54] DOLLY WITH TANK LATCH

[75] Inventor: Robert C. Berfield, Jersey Shore, Pa.

[73] Assignee: Shop-Vac Corporation, Williamsport, Pa.

[21] Appl. No.: 703,088

[22] Filed: Feb. 19, 1985

[51] Int. Cl.⁴ .............................................. B62B 1/10
[52] U.S. Cl. ................................ 280/47.34; 248/129; 280/47.26
[58] Field of Search ............. 280/47.34, 79.2, 33.99 F, 280/47.35, 47.13 R, 47.26; 248/154, 129

[56] References Cited

U.S. PATENT DOCUMENTS

| | | | |
|---|---|---|---|
| 1,598,135 | 8/1926 | Heinson | 248/154 |
| 2,114,735 | 4/1938 | Crilly | 248/121 |
| 2,291,984 | 8/1942 | Ponselle | 280/47.34 |
| 2,389,574 | 11/1945 | Hulquist | 280/47.34 |
| 2,699,339 | 1/1955 | Benstein | 280/47.34 |
| 2,869,885 | 1/1959 | Doyle | 280/47.34 |
| 2,930,561 | 3/1960 | Bittle | 248/154 |

Primary Examiner—John J. Love
Assistant Examiner—Michael Mar
Attorney, Agent, or Firm—Ostrolenk, Faber, Gerb & Soffen

[57] ABSTRACT

A dolly includes a frame-like base that supports a cylindrical cannister on its closed lower end. A U-shaped latch member pivotally mounted on the base is movable relative thereto between releasing and holding positions. In moving to the latter position, the latch member snaps above a bead surrounding the sidewall of the cannister at the bottom thereof. During this movement of the latch member, the bead is moved below one or more inward protrusions on the base. Notches in the base receive the cannister to position the latter. These notches also limit relative movement between the cannister and the base to that required for the bead to move below the protrusions for latching and clear of the protrusions for separating the cannister from the base to empty the former.

20 Claims, 8 Drawing Figures

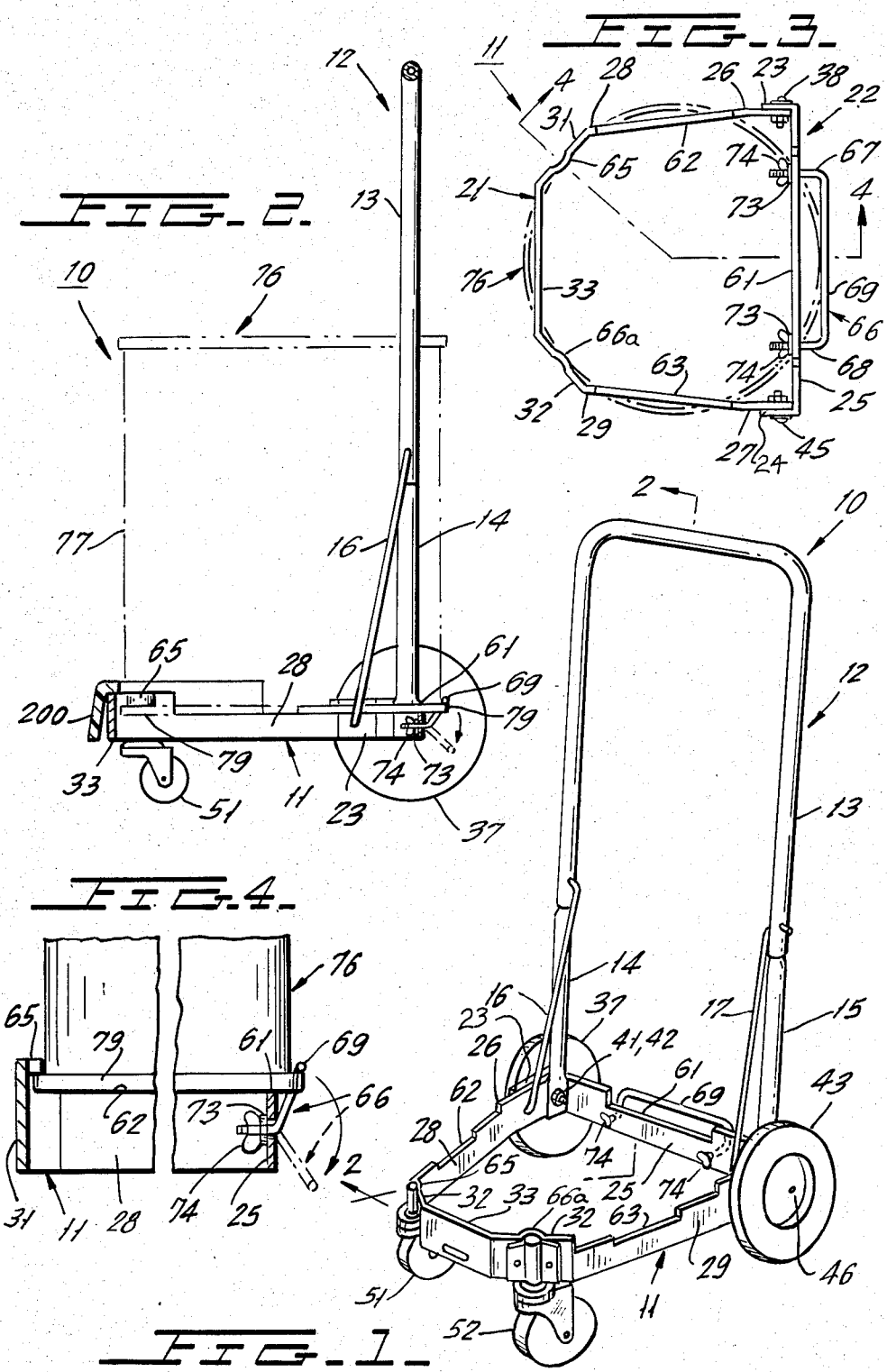

DOLLY WITH TANK LATCH

BACKGROUND OF THE INVENTION

This invention relates generally to hand carts and dollies, and more particularly relates to a latching means for securing a tank to a dolly.

In the prior art dollies for transporting barrels or tanks standing on end have been provided with means of various types to secure the load to the dolly. For the most part, the holding means was secured to the handle that extends upward from the dolly base. Typical prior art constructions are disclosed in U.S. Pat. Nos. 1,220,640, 1,936,664, 2,114,735, 2,291,984, 2,740,981, 3,356,383 and 4,222,145.

SUMMARY OF THE INVENTION

In accordance with the instant invention, a dolly is provided with a releasable latch means that is pivoted to the base of the dolly and is movable between latching and releasing positions where it is, respectively, engaged with and disengaged from a bead that surrounds the side wall of the tank at the bottom thereof. In moving to its latching position, the latch forces the tank forward so that the bead moves beneath one or more holding projections on the base and thereafter the latch snaps over the bead to be held in latching position.

The latch is released by applying a downward force thereto, as by stepping upon same. This snaps the latching member over the bead in the downward direction so that the tank is now free to be moved clear of the holding projections and thereafter be removed from the base.

In one embodiment of this invention (four-wheeled version) the base is provided with two holding projections, and in a second embodiment (three-wheeled version) the base is provided with a single holding projection.

Accordingly, the primary object of the instant invention is to provide a dolly having improved releasable latch means.

Another object is to provide a dolly with improved latch means that is simple to operate.

Still another object is to provide a dolly having a latch means that is pivotally mounted to the base thereof.

A further object is to provide a dolly with an improved latch means that is foot operable for releasing a load carried by the base of the dolly.

A still further object is provide a dolly having an improved latch so constructed that in moving toward its latching position it snaps over a bead at the lower end of the tank that is supported endwise on the dolly.

BRIEF DESCRIPTION OF THE DRAWINGS

These objects as well as other objects of this invention shall become readily apparent after reading the following description of the accompanying drawings in which:

FIG. 1 is a perspective of a four-wheeled dolly constructed in accordance with teachings of the instant invention.

FIG. 2 is a cross-section taken through the plane defined by a zig-zag line 2—2 of FIG. 1.

FIG. 3 is a plan view of the dolly base.

FIGS. 4 and 5 are cross-sections (FIG. 4 being fragmentary) taken through line 4—4 of FIG. 3 looking in the direction of arrows 4—4 showing a tank supported on the base. In FIG. 4 the tank is secured to the base by a releasable latch, and in FIG. 5, said latch is released and the tank is in position for being removed from the base.

DETAILED DESCRIPTION

Figure 5:
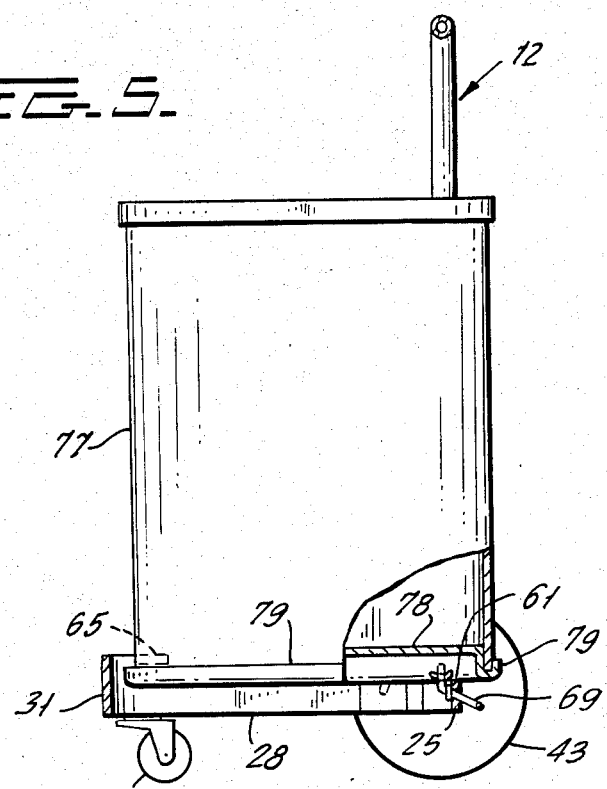

Now referring to the figures, and more particularly to FIGS. 1-6. Hand cart or dolly 10 of FIG. 1 includes frame-like horizontal base 11 having handle 12 extending upward therefrom. As seen best in FIG. 6, handle 12 includes inverted U-shaped tubular element 13 and extensions 14, 15 that extend downward from the U-arms, being partially telescoped therewith. Stabilizing rods 16, 17 extend downwardly from the regions where the respective extensions 14, 15 are overlapped by the arms of element 13, and are angled forward. The bottom ends of rods 16, 17 are received by the respective apertures 18, 19 in generally U-shaped front element 21 of base 11. The latter also includes generally straight rear element 22 whose ends 23, 24 are bent forward from rear wall 25 thereof to partially overlap and lie outboard of the respective portions 26, 27 of the base side sections which also include portions 28, 29 that extend to the front section of base element 21. The latter includes oppositely directed angled portions 31, 32 at opposite ends of central portion 33 that is parallel to rear wall 25.

The lower ends of handle extensions 14, 15 are flattened and are disposed adjacent the inner surfaces of the respective side portions 26, 27. Aperture 34 at the lower end of extension 14 receives screw 35 that extends through sleeve 36 on which relatively large wheel 37 is rotatably mounted so as to be disposed outboard of base 11. Outward conical protrusion 38 of extension 23 limits movement of wheel 37 toward base 11. After passing through a central aperture in protrusion 38, screw 35 passes through clearance aperture 39 in side portion 26 and through handle aperture 34, and then receives securing nut 41 and lock nut 42.

In a similar manner, another relatively large wheel 43 is rotatably mounted on sleeve 44 adjacent outward conical protrusion 45 of extension 24. Screw 46 extends through sleeve 44, a central aperture in protrusion 45, aperture 47 in side portion 27, and threadably receives securing nut 48 and lock nut 49. Thus, it is seen that screws 36 and 46 are axially aligned so that wheels 37 and 43 rotate about a common horizontal axis that is fixed with respect to base 11. Screws 36 and 46 also secure handle 12 to base 11.

The front of base 11 is supported by two swivel-type caster units 51, 52 that are mounted to the respective front portions 31, 32 by the respective brackets 53, 54, each of which is operatively secured by two screws 55. In a manner known to the art, U-shaped plastic bumper 200 is snap fitted over portions 31, 32, 33 of front element 21.

Two protrusions 56 extending outward from side section 27 are received by two apertures 57 in rear element extension 24 to operatively position one side of front element 21 relative to rear element 22. The other side of front element 21 is similarly positioned by outward protrusions of side portion 26 that are received by apertures 58 of rear element extension 23. For reasons to be hereinafter seen, the upper edges of the respective side portions 28, 29 are provided with the respective elongated notches 62, 63 and front portions 31, 32 are provided with the respective inward projections 65, 66a. Further, the upper edge of rear wall 25 is provided with elongated notch 61.

Releasable latch means 66 is a generally U-shaped member having relatively short arms 67, 68 that extend forward from opposite ends of relatively long web or holding portion 69. Arms 67, 68 extend through respective oversized apertures 71, 72 in rear wall 25 and the threaded end of each arm 67, 68 receives a flat washer 73 and a wing nut 74, both of the latter being positioned inside of base 11. It should now be obvious to those skilled in the art, the relative proportions of apertures 71, 72 and arms 67, 68 permits latch member 66 to pivot relative to base 11 between the latching position of FIG. 4 and the releasing position of FIG. 5.

Base 11 is adapted to support a cylindrical tank 76 standing on its closed bottom end. Typically, tank 76 constitutes the dirt collecting chamber of a bypass type vacuum cleaner whose suction-producing motor and fan (not shown) are affixed to tank 76 at the upper open end thereof. Tank 76 includes side wall 77 that is of circular cross-section, slightly recessed bottom wall 78 and bead 79 that surrounds wall 77 at the bottom thereof.

As seen in FIG. 3, tank 76 is supported from below by base 11, portions of the lower end of tank 76 are disposed within notches 61, 62, 63. When latch means 66 is pivoted to its latching position of FIG. 4, latching portion 69 forces bead 79 forward under projections 65, 66 and the central section of holding portion 69 snaps over bead 79. Thus, projections 65, 66 and holding portion 69 are well positioned above bead 79 to prevent separation of tank 76 from base 11.

To dismount tank 76 from base 11, holding portion 69 is pivoted downward to its releasing position of FIG. 5, as by stepping down on either end of holding portion 69. Now tank 76 may be moved rearward until bead 79 clears projections 65, 66. This rearward movement is limited by the diameter of bead 79 in proportion to the lengths of notches 61, 62, 63, just as one or more of the notches 61 and 91-94 in the embodiment of FIGS. 7 and 8, to be described, limit rearward movement of tank 76. Thereafter, tank 76 may be lifted from base 11 and the contents of tank 76 emptied.

Figure 7:
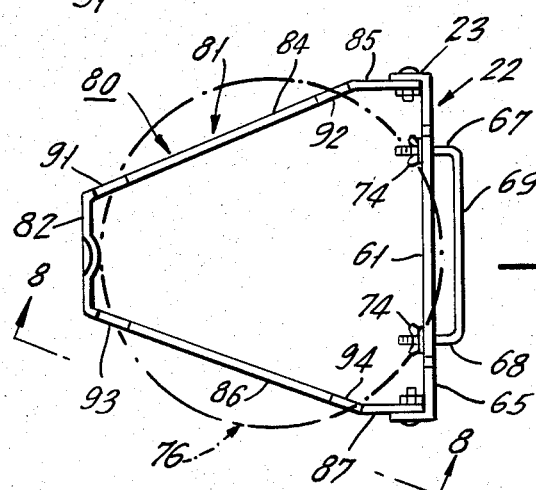
FIG. 7 is a plan view illustrating an alternate construction (three-wheeled version) for the dolly base.
Figure 8:
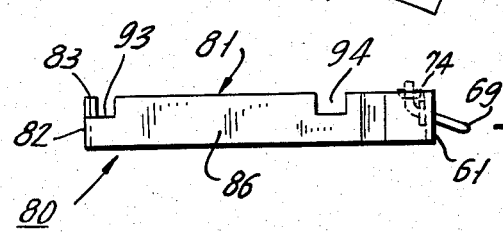
FIG. 8 is a side elevation looking in the direction of arrows 8—8 of FIG. 7.
Figure 6:
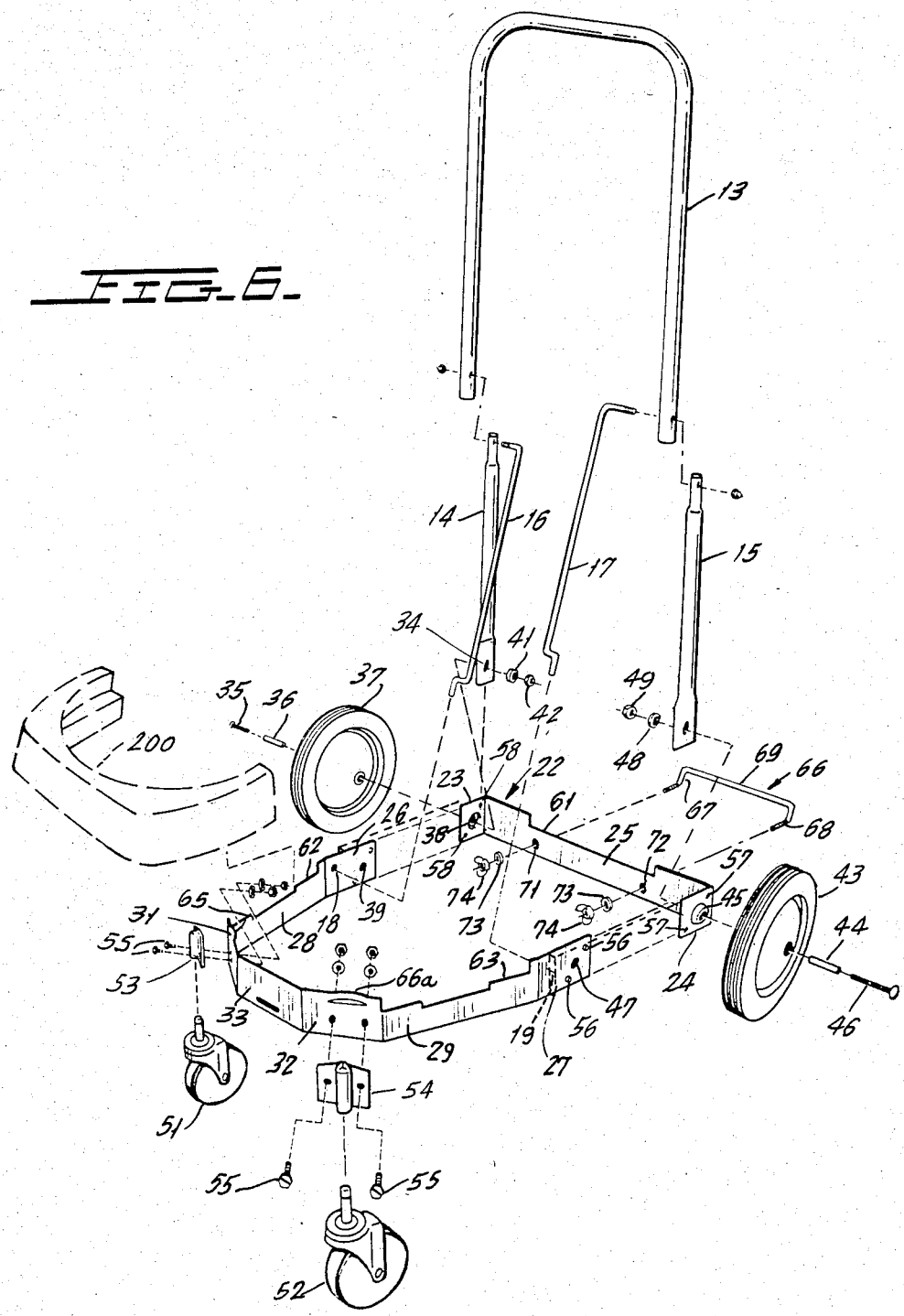
FIG. 6 is an exploded perspective of the dolly of FIGS. 1-5.

FIGS. 7 and 8 illustrate base 80 which may be used to replace base 11 in a three-wheeled version of a dolly constructed in accordance with teachings of the instant invention. The same reference numerals are utilized to indicate identical elements in FIGS. 3 and 7.

Base 80 includes rear element 22 and front element 81 that are connected to one another in the same way that front element 21 and rear element 22 are connected to each other in FIGS. 1-6. Front element 81 includes relatively short front section 82 that is parallel to rear section 25 and centered with respect thereto. One end of front section 82 is connected to rear section 21 by the side section consisting of portions 84, 85, and the other end of front section 82 is connected to rear element 22 by a side section consisting of portions 86, 87. Side sections 84, 86 flair outwardly in opposite directions from front section 82. The top edge of front section 82 at the central portion thereof is provided with inward projection 83 which serves the same function as inward projections 65 and 66 in the embodiment of FIG. 3.

Similarly, front section 82 serves the same function as either of the front portions 31 or 32 in the embodiment of FIG. 3. That is, front section 82 is used for attachment of a bracket means (not shown) that receives a single swivel type caster assembly such as 51 or 52.

Notches 91, 92 are provided in the upper edge of side portion 84 and notches 93, 94 are provided in the upper edge of side portion 86. These notches, as well as notch 61 in rear wall 25, receive bead 79 and limit front to back movement of tank 76 on base 80 just as notches 61, 62, 63 limit the movement of tank 76 on base 11.

Although not shown, it should now be obvious to one skilled in the art that relatively large wheels 37, 43, handle elements 13, 14, 15, and stabilizers 16, 17 may be secured to base 80 just as these elements were secured to base 11.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A dolly for movably supporting a tank having a circular side-wall, a closed bottom and an outwardly extending bead on the side-wall at the bottom thereof, said dolly including:
    a base, a wheel means on said base for horizontally positioning the latter, and releasable latch means on said base for maintaining a tank supported by said base from below latched to said base;
    said base being frame-like and including a rear section, a front section, and side sections extending from opposite ends of said rear section to said front section;
    said front section having inwardly protruding means operatively positioned to extend slightly above the bead of a tank supported on said rear section and said side sections;
    said latch means including a holding portion disposed outside said base in the vicinity of said rear section and being movable relative thereto, while remaining on said base, between a raised tank latching position and a lowered tank releasing position;
    said holding portion when moved from said releasing position to said latching position snapping over said bead and forcing said bead forward under said inwardly protruding means to lock said tank to said base;
    said rear section and said side sections including walls having notch means extending downward from upper edges thereof;
    said notch means being adapted to receive a bead of a tank supported by said base to operatively position such tank on said base for cooperation of such bead with said holding portion and said inwardly protruding means to lock said tank to said base when said holding portion is in said latching position;
    said notch means being proportioned to permit limited rearward movement of a tank supported by said base, when said holding portion is in said releasing position, to a position wherein the bead is clear of said inwardly protruding means to permit dismounting such tank from said base.

2. A dolly as set forth in claim 1 in which the wheel means includes wheels at opposite ends of said rear wall and rotatable about a common horizontal axis fixed with respect to said base; said wheel means also including at least one swivel type caster unit mounted to said front section.

3. A dolly as set forth in claim 2 also including handle means extending upward from said base and being connected thereto in the vicinity of said common axis.

4. A dolly as set forth in claim 2 in which said inwardly projecting means includes a projection in the vicinity of each swivel type caster unit of said wheel means.

5. A dolly as set forth in claim 4 in which the front section includes a central portion extending generally parallel to said rear section;
said front section also including oppositely angled portions at opposite ends of said central portion extending toward said rear section;
each of said oppositely angled portions having an individual one of said swivel type caster units mounted thereto.

6. A dolly as set forth in claim 4 in which the side sections extend from opposite ends of said rear section and are angled toward one another; and
said front section having a portion extending generally parallel to said rear section and having one of said swivel type caster units mounted thereto.

7. A dolly as set forth in claim 1 in which said latch means is generally U-shaped and includes an individual arm extending from each end of said holding portion with the latter being relatively long compared to said arms;
said latch means being connected to rear section at said arms.

8. A dolly as set forth in claim 7 in which the wheel means includes wheels at opposite ends of said rear wall and rotatable about a common horizontal axis fixed with respect to said base; said wheel means also including at least one swivel type caster unit mounted to said front section.

9. A dolly as set forth in claim 7 in which said rear section includes an elongated rear wall; said holding portion extending generally parallel to said rear wall;
connecting means joining said arms with said rear wall to permit said latch means to pivot relative to said rear wall as said holding portion moves between said tank latching and releasing positions.

10. A dolly for movably supporting a tank having a circular side-wall, a closed bottom and an outwardly extending bead on the side-wall at the bottom thereof, said dolly including:
a base, a wheel means on said base for horizontally positioning the latter, and releasable latch means on said base for maintaining a tank supported by said base from below latched to said base;
said base being frame-like and including a rear section, a front section, and side sections extending from opposite ends of said rear section to said front section;
said front section having inwardly protruding means operatively positioned to extend slightly above the bead of a tank supported on said rear section and said side sections;
said latch means including a holding portion disposed outside said base in the vicinity of said rear section and being movable relative thereto, while remaining on said base, between a raised tank latching position and a lowered tank releasing position;
said holding portion when moved from said releasing position to said latching position snapping over said bead and forcing said bead forward under said inwardly protruding means to lock said tank to said base;
said latch means being generally U-shaped and includes an individual arm extending from each end of said holding portion with the latter being relatively long compared to said arms;
said latch means being connected to rear section at said arms;
said rear section including an elongated rear wall; said holding portion extending generally parallel to said rear wall;
connecting means joining said arms with said rear wall to permit said latch means to pivot relative to said rear wall as said holding portion moves between said tank latching and releasing positions;
said connecting means including oversized apertures in said rear wall and through which said arms extend.

11. A dolly as set forth in claim 10 in which each arm at its end remote from said holding portion is provided with a screw thread; and
a nut means for each of said arms threadably engaged with the screw thread thereof to retain said latch means mounted to said rear wall and to adjust the distance between said rear wall and said holding portions.

12. A dolly as set forth in claim 10 in which said rear section and said side sections include walls having notch means extending downward from upper edges thereof;
said notch means being adapted to receive a bead of a tank supported by said base to operatively position such tank on said base for cooperation of such bead with said holding portion and said inwardly protruding means to lock said tank to said base when said holding portion is in said latching position.

13. A dolly as set forth in claim 12 in which said notch means is porportioned to permit limited rearward movement of a tank supported by said base, when said holding portion is in said releasing position, to a position wherein the bead is clear of said inwardly protruding means to permit dismounting such tank from said base.

14. A dolly as set forth in claim 12 in which the wheel means includes wheels at opposite ends of said rear wall and rotatable about a common horizontal axis fixed with respect to said base; said wheel means also including at least one swivel type caster unit mounted to said front section.

15. A dolly as set forth in claim 14 in which said inwardly projecting means includes a projection in the vicinity of each swivel type caster unit of said wheel means.

16. A dolly as set forth in claim 15 in which the front section includes a central portion extending generally parallel to said rear section;
said front section also including oppositely angled portions at opposite ends of said central portion extending toward said rear section;
each of said oppositely angled portions having an individual one of said swivel type caster units mounted thereto.

17. A dolly as set forth in claim 15 in which the side sections extend from opposite ends of said rear section and are angled toward one another; and
said front section having a portion extending generally parallel to said rear section and having one of said swivel type caster units mounted thereto.

18. A dolly as set forth in claim 10 in which the wheel means includes wheels at opposite ends of said rear wall and rotatable about a common horizontal axis fixed with respect to said base; said wheel means also including at least one swivel type caster unit mounted to said front section.

19. A dolly as set forth in claim 18 in which said inwardly projecting means includes a projection in the vicinity of each swivel type caster unit of said wheel means.

20. A dolly as set forth in claim 19 in which the front section includes a central portion extending generally parallel to said rear section;

said front section also including oppositely angled portions at opposite ends of said central portion extending toward said rear section;

each of said oppositely angled portions having an individual one of said swivel type caster units mounted thereto.

* * * * *